(12) United States Patent
Jeuk et al.

(10) Patent No.: US 11,394,639 B2
(45) Date of Patent: *Jul. 19, 2022

(54) SOFTWARE VERSION AWARE NETWORKING

(71) Applicant: Cisco Technology, Inc., San Jose, CA (US)

(72) Inventors: Sebastian Jeuk, Munich (DE); Gonzalo A. Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,569

(22) Filed: Apr. 8, 2021

(65) Prior Publication Data

US 2021/0226885 A1   Jul. 22, 2021

Related U.S. Application Data

(63) Continuation of application No. 16/172,765, filed on Oct. 27, 2018, now Pat. No. 10,979,347.

(51) Int. Cl.
| | |
|---|---|
| *H04L 12/24* | (2006.01) |
| *H04L 45/30* | (2022.01) |
| *H04L 47/2408* | (2022.01) |
| *H04L 12/46* | (2006.01) |
| *H04L 41/50* | (2022.01) |
| *H04L 69/22* | (2022.01) |
| *H04L 45/302* | (2022.01) |

(52) U.S. Cl.
CPC ........ *H04L 45/306* (2013.01); *H04L 12/4633* (2013.01); *H04L 41/50* (2013.01); *H04L 47/2408* (2013.01); *H04L 69/22* (2013.01)

(58) Field of Classification Search
CPC ..... H04L 41/0873; H04L 41/22; H04L 43/06; H04L 45/306; H04L 12/4633; H04L 41/50; H04L 69/22
See application file for complete search history.

(56) References Cited

U.S. PATENT DOCUMENTS

| | | | |
|---|---|---|---|
| 2017/0310611 A1* | 10/2017 | Kumar | H04L 67/2842 |
| 2019/0036818 A1* | 1/2019 | Nainar | H04L 45/74 |
| 2019/0296976 A1* | 9/2019 | Maes | H04L 12/4641 |
| 2021/0273883 A1* | 9/2021 | Hu | H04L 45/64 |

* cited by examiner

*Primary Examiner* — Nicholas R Taylor
*Assistant Examiner* — Sanjoy K Roy
(74) *Attorney, Agent, or Firm* — Patterson + Sheridan, LLP (57) ABSTRACT

Certain aspects of the present disclosure are generally directed to version-aware service function chaining. One example method generally includes determining version information corresponding to one or more of a plurality of network functions to be performed for a packet for a service function chain (SFC) and encapsulating a service header in the packet for the SFC, the service header indicating the plurality of network functions to be performed for the packet and the version information corresponding to the one or more network functions. In certain aspects, the method also includes sending the packet to one or more service nodes for performing the plurality of network functions in accordance with the service header.

20 Claims, 7 Drawing Sheets

SOFTWARE VERSION AWARE NETWORKING

CROSS-REFERENCE TO RELATED APPLICATIONS

This application is a continuation of co-pending U.S. patent application Ser. No. 16/172,765, filed Oct. 27, 2018. The aforementioned related patent application is herein incorporated by reference in its entirety.

TECHNICAL FIELD

Certain aspects of the present disclosure generally relate to managing network operations, and more specifically, to managing a service function chain.

BACKGROUND

In computer networking, network administrators are often concerned with how to best route traffic flows from one end point to another end point across a network. When provisioning a route for a traffic flow, administrators may implement policies to ensure that certain network functions are applied to the packet or the traffic flow as it traverses across the network. Network functions may provide security, wide area network (WAN) acceleration, and load balancing. These network functions may be implemented at various points in the network infrastructure, such as the wide area network, data center, campus, etc. Network elements providing these network functions are generally referred to as service nodes.

Traditionally, service node deployment is dictated by the network topology. For instance, firewalls are usually deployed at the edge of an administrative zone for filtering traffic leaving or entering the particular zone according to a policy for that zone. With the rise of virtual platforms and more agile networks, service node deployment may no longer be bound by the network topology. To enable service nodes to be deployed anywhere on a network, a solution can use a service function chain (SFC) where headers may be encapsulated with packets or frames to prescribe service paths for traffic flows through the appropriate service nodes.

BRIEF DESCRIPTION OF THE DRAWINGS

So that the manner in which the above-recited features of the present disclosure can be understood in detail, a more particular description of the disclosure, briefly summarized above, may be had by reference to aspects of the present disclosure, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DESCRIPTION OF EXAMPLE EMBODIMENTS

Overview

Certain aspects of the present disclosure provide a method. The method generally includes determining version information corresponding to one or more network functions to be performed for a packet relating to an ordered set of network functions. The method further includes encapsulating a header in the packet for the ordered set of network functions, the header indicating the one or more network functions to be performed for the packet and the version information corresponding to the one or more network functions. The method further includes sending the packet to one or more nodes for performing the one or more network functions in accordance with the header for the ordered set of network functions and the version information. The one or more nodes are configured to: identify a next destination for the packet, relating to performing the one or more network functions, based on determining that the network function version information indicated in the header for the ordered set of network functions corresponds to version information relating to the next destination, and forward the packet to the next destination.

Certain aspects of the present disclosure provide a computer-readable medium having instructions, to be executed by a processor, for performing operations. The operations include determining version information corresponding to one or more network functions to be performed for a packet relating to an ordered set of network functions. The operations further include encapsulating a header in the packet for the ordered set of network functions, the header indicating the one or more network functions to be performed for the packet and the version information corresponding to the one or more network functions. The operations further includes sending the packet to one or more nodes for performing the one or more network functions in accordance with the header for the ordered set of network functions and the version information. The one or more nodes are configured to identify a next destination for the packet, relating to performing the one or more network functions, based on determining that the network function version information indicated in the header for the ordered set of network functions corresponds to version information relating to the next destination, and forward the packet to the next destination.

Certain aspects of the present disclosure provide a method. The method generally includes receiving a packet for an ordered set of network functions, a header of the packet indicating one or more network functions to be performed for the packet and version information corresponding to the one or more network functions. The method further includes identifying a next destination for the packet, relating to performing the one or more network functions, based on determining that the network function version information indicated in the header for the ordered set of network functions corresponds to version information relating to the next destination. The method further includes forwarding the packet to identified next destination.

Example Embodiments

To accommodate agile networking and flexible provisioning of network nodes in the network, a SFC may be used to implement an ordered set of service functions (SF) to be applied to packets and/or frames of a traffic flow. SFCs provide a method for deploying SFs in a way that enables dynamic ordering and topological independence of those SFs. A service function chain may define an ordered set of network functions that is applied to packets and/or frames of a traffic flow, where the ordered set of network functions is selected as a result of classification. The term service chain may be used as shorthand for service function chain. Certain aspects of the present disclosure are generally directed to a version-aware SFC. For example, in certain aspects, a version corresponding to each of the SFs to be applied to packets and/or frames may be indicated, as described in more detail herein.

Figure 1A:
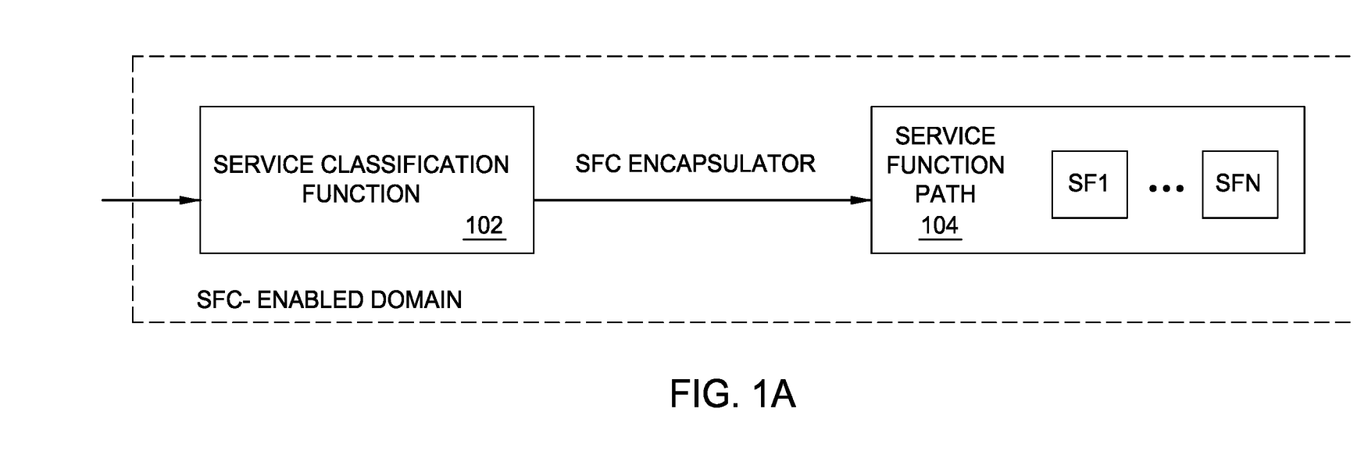
FIG. 1A illustrates a service function chain (SFC), which may include an initial service classification function, as an entry point into a service function path (SFP), according to certain aspects of the present disclosure.

FIG. 1A illustrates a SFC, which may include an initial service classification function 102, as an entry point into a service function path (SFP) 104 (or service path). The service classification function 102 prescribes a service path, and encapsulates a packet or frame with the service path information which identifies the service path. The classification potentially adds metadata, or shared context, to the SFC encapsulation part of the packet or frame. The service function path 104 may include a plurality of service functions (shown as "SF1", . . . "SFN").

A network function (NF) (also referred to as a service function or virtual network function (vNF)) may be responsible for specific treatment of received packets. A network function may be a virtual instance or be embedded in a physical network element such as a service node. When a network function or other modules of a service node is executed by the at least one processors of the service node, the service function or other modules implement any one of the methods described herein. Multiple network functions may be embedded in the same network element. A non-exhaustive list of SFs includes: firewalls, WAN and application acceleration, deep packet inspection (DPI), server load balancers, etc.

A service node (SN) may be a physical network element (or a virtual element embedded on a physical network element) that hosts one or more service functions (SFs) and has one or more network locators associated with it for reachability and service delivery. In many standardization documents, "service functions" refer to the service nodes described herein as having one or more service functions hosted thereon. SFP relates to the implementation of a SFC in the network. Packets follow a service path from a classifier through the requisite service functions.

Figure 1B:
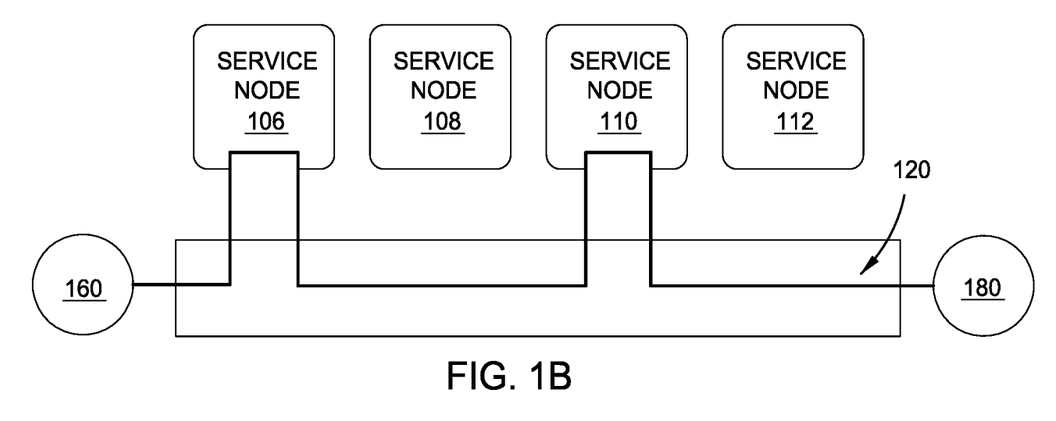
FIGS. 1B-C illustrate different service paths realized using service function chaining, according to certain aspects of the present disclosure.
Figure 1C:
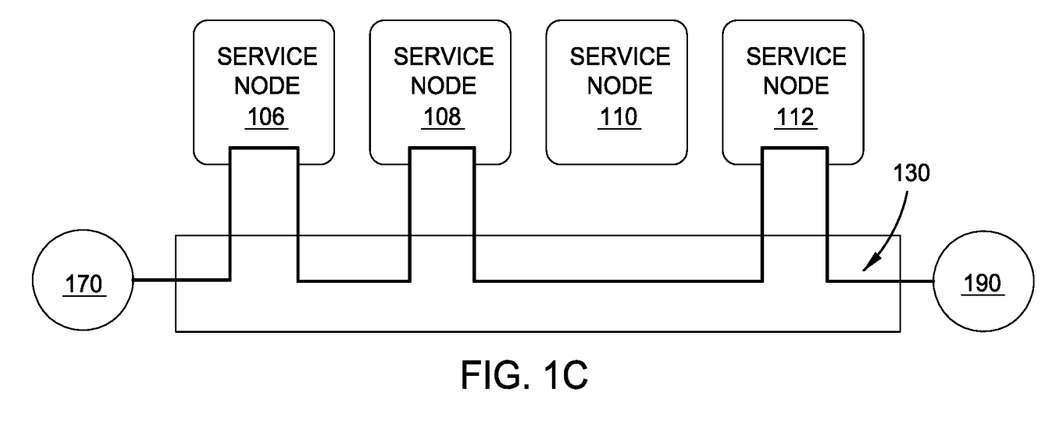

FIGS. 1B-C illustrate different service paths realized using service function chaining. These service paths may be implemented by encapsulating packets of a traffic flow with a network service header (NSH) or some other suitable packet header (e.g., a segment routing version 6 (SRv6) header) which specifies a desired service path by identifying a particular service path using service path information in the header. In the example shown in FIG. 1B, a service path 120 may be provided between end point 160 and endpoint 180 through service node 106 and service node 110. In the example shown in FIG. 1C, a service path 130 may be provided between end point 170 and endpoint 190 through service node 106, service node 108, and service node 112.

Generally, an NSH includes service path information, and the NSH is added to a packet or frame. For instance, an NSH may include a data plane header added to packets or frames. The NSH includes information for service chaining, and in some cases, the NSH can include metadata added and/or consumed by service nodes or service functions. For example, in certain aspects of the present disclosure, the metadata may indicate a version corresponding to the network functions to be performed for the SFC, as will be described in more detail herein.

The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow. A service function forwarder (SFF) may be responsible for forwarding traffic to one or more connected service functions according to information carried in the SFC encapsulation, as well as handling traffic coming back from the SF.

Figure 2:
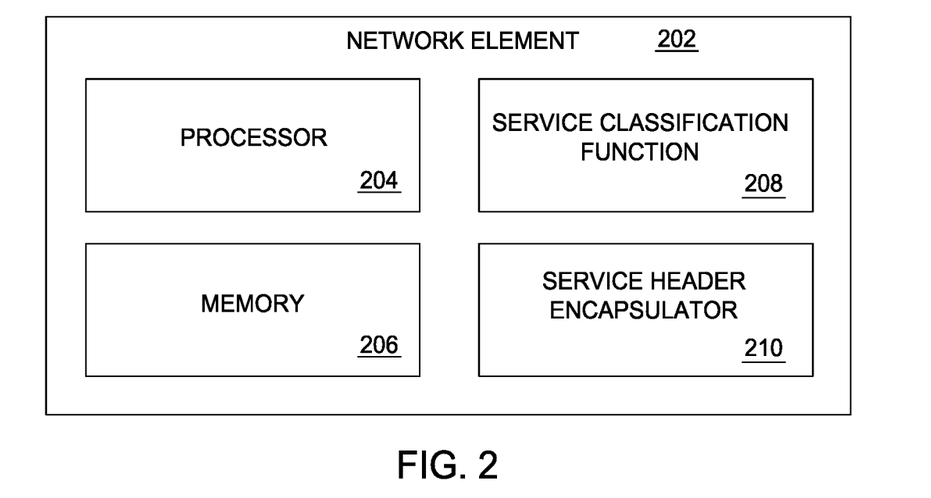
FIG. 2 illustrates a system view of SFC-aware network element, according to certain aspects of the present disclosure.

FIG. 2 shows a system view of SFC-aware network element, e.g., such as a service classifier (SCL), for prescribing a service path of a traffic flow, according to certain aspects of the present disclosure. Network element 202 includes processor 204, (computer-readable) memory 206 for storing data and instructions. Furthermore, network element 202 includes service classification function 208 and service header encapsulator 210 (both can be provided by processor 204 when processor 204 executes the instructions stored in memory 206).

The service classification function 208 processes a packet of a traffic flow and determines whether the packet requires servicing and which service path to follow to apply the appropriate service. The determination may be performed based on business policies and/or rules stored in memory 206. Once the determination of the service path is made, service header encapsulator 210 generates an appropriate NSH having identification information for the service path and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 202 may also remove the NSH if the service classification function 208 determines the packet does not require servicing.

A service function of a service node may derive policy selection from the NSH. An NSH may provide a range of service-relevant information such as traffic classification. Service functions may use NSH to select local service policy. Once properly encapsulated, the packet having the NSH is then forwarded to one or more service nodes where service(s) may be applied to the packet/frame. While certain examples provided herein are described with respect to an NSH to facilitate understanding, aspects of the present disclosure may be implemented using any suitable header, such as a segment routing version 6 (SRv6) header.

Figure 3:
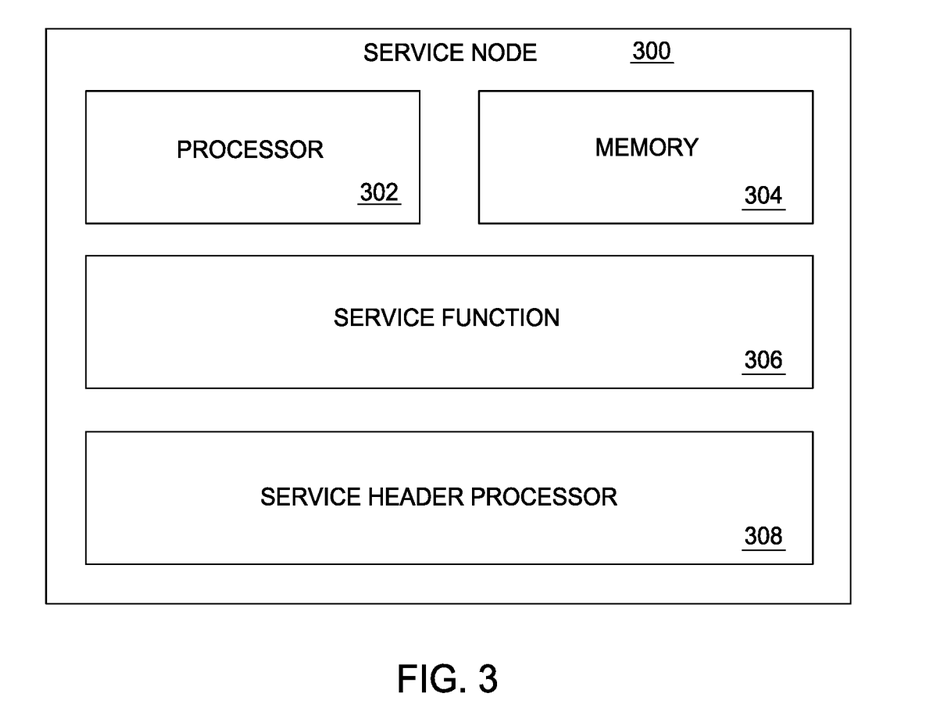
FIG. 3 shows a system view of a service node, according to certain aspects of the present disclosure.

FIG. 3 shows a system view of a service node, according to certain aspects of the present disclosure. Service node 300, generally a network element, may include processor 302, (computer-readable) memory 304 for storing data and instructions. Furthermore, service node 300 includes service function(s) 306 (e.g., for applying service(s) to the packet/frame, classifying the packet/frame) and service header processor 308. The service functions(s) 306 and service header processor 306 may be provided by processor 302 when processor 302 executes the instructions stored in memory 304. Service header processor 308 may extract the NSH, and in some cases, update the NSH as needed.

Certain aspects of the present disclosure provide a software defined network (SDN)-based system that introduces software version management within network policies. For example, certain aspects provide a metadata-based transport approach to incorporate versioning details about network or virtualized entities (such as vNFs, routers, etc.) and define policies accordingly. Being able to dynamically select versions of network functions enables smooth (uninterrupted) updates on the fly. For example, multiple versions of a network function may be running within the same environment. An old version of a network function may be currently used for production traffic. Over time, the traffic may be slowly migrated off the old version onto a new version, by the changing the version tag in a service header of a packet. Here, this version tag may be included, for example, in a SFC on a per-network function basis. Certain software versions may be stable (e.g., released) or master (e.g., experimental). Certain versions may have features disabled or may have performance enhancements. Some versions may be per segment (e.g., enterprise vs. service provider) or may be vertical (e.g., manufacturing vs. health care).

Reasons for addressing different versions for network functions are multi-fold. For example, a specific version of a network function may be undergoing testing for production. However, applications may be implemented with newer versions to enhance performance and capabilities and improve services that can be offered to tenants. Additionally, different versions addressed within a service chain also allow implementing more fine-grained service level agreements (SLAs). For example, versions may be used to define what features are applied/available/implemented in what way.

Figure 4:
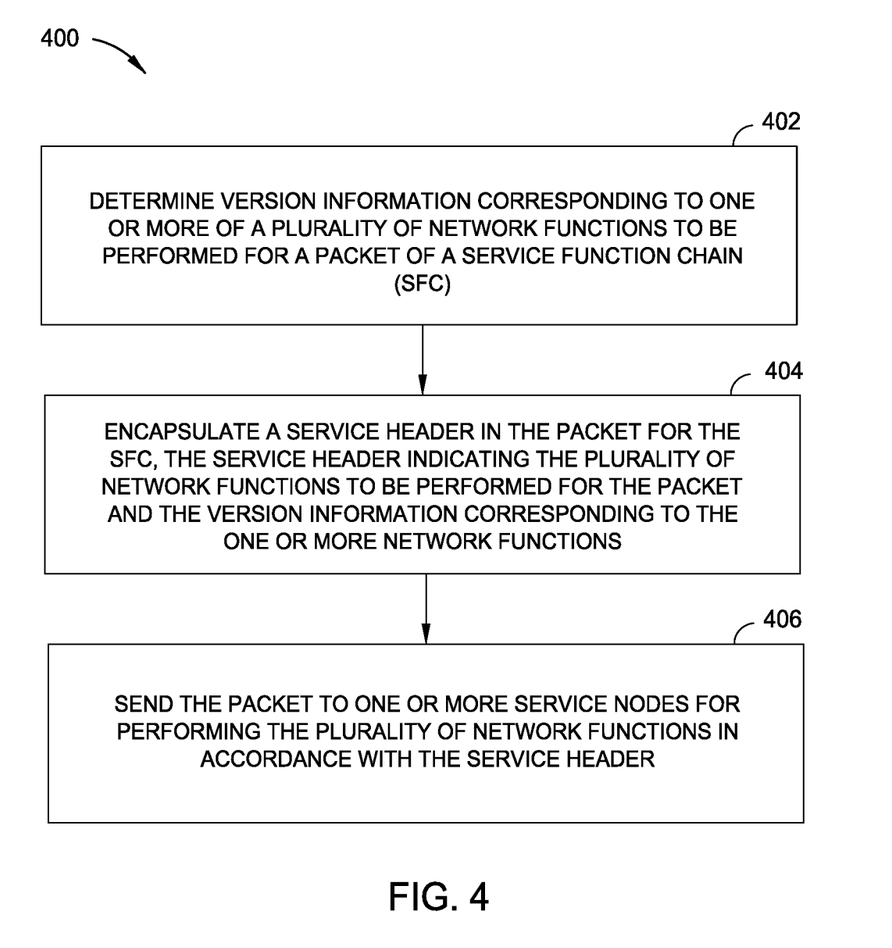
FIG. 4 is a flow diagram illustrating example operations for service function chaining, in accordance with certain aspects of the present disclosure.

FIG. 4 is a flow diagram illustrating example operations 400 for service function chaining, in accordance with certain aspects of the present disclosure. The operations 400 may be performed by a network entity such as a service function classifier.

The operations 400 generally include, at block 402, determining version information corresponding to one or more of a plurality of network functions to be performed for a packet for a SFC. For example, each of the network functions (e.g., virtual network functions (vNFs)) may be implemented with code having multiple versions, as will be described in more detail herein with respect to FIG. 5.

Figure 5:
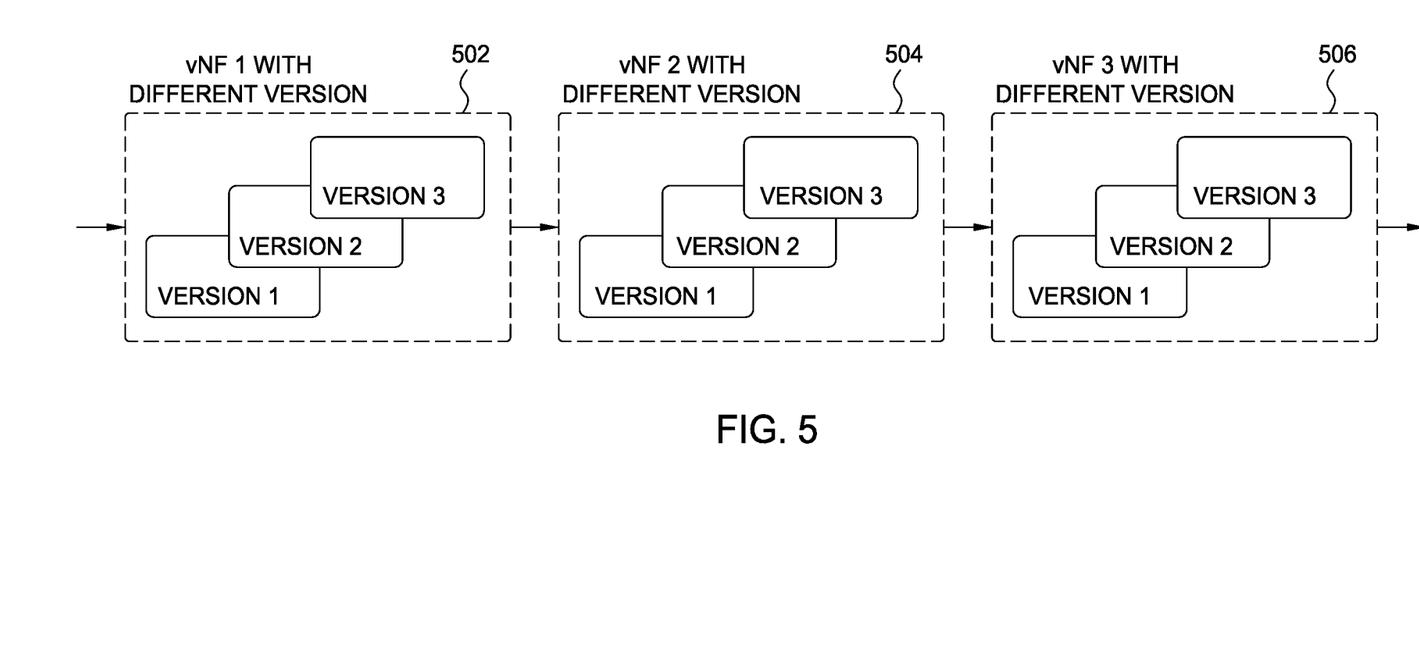
FIG. 5 illustrates a service path of multiple network functions, each implemented with code having multiple versions, in accordance with certain aspects of the present disclosure.

FIG. 5 illustrates a service path of multiple network functions, each implemented with code having multiple versions, in accordance with certain aspects of the present disclosure. For example, each of network functions 502, 504, 506 may be implemented using different versions (e.g., version 1, version 2, version 3). In certain aspects, an SFC may be defined with different versions with no direct relationship between versions of network functions.

In certain aspects, versions for an SFC may correlate between the network functions. For example, using version 1 in network function 502 may be dependent on version 3 of network function 504 and vice versa. In other words, the determination of the version information, at block 402 of FIG. 4, may be based on a dependency between versions of the plurality of network functions.

Each of the versions of network functions may interact with (e.g., be dependent on) prior and consecutive versions differently. Hence, it may be important to provide a version-dependent approach. For example, a specific version of network function 502 may be known to cause problems with another version within the same chain due to, for example, a specific protocol within that version having a bug. Thus, the version of code corresponding to each of the network functions may be selected to avoid these problems or bugs.

In certain aspects, a version based SFC may be influenced by additional parameters which may be specified in metadata. For example, the version dependency of the network functions may be determined based on feature requirements corresponding to the packet. The version-dependent chain may be generated based the additional parameters to, for example, avoid interoperability issues.

Certain aspects of the present disclosure are generally directed to machine-learning based version-dependency improvements over time. For example, the operations 400 may also include determining the dependency between the versions of the network functions based on previous interactions of the versions of the network functions using machine learning. That is, rather than implementing a static version dependency for the network functions which may have to be updated manually on a case by case basis, a dynamic version aware network may be implemented. Machine learning may be implemented to learn version dependencies over time, and improve flows and versions corresponding to the network functions based on historical learnings. Machine learning is important, especially when versions of network functions are changing frequently. Based on previous interactions of network function versions, SFCs may be dynamically adjusted to improve version selection.

Certain aspects of the present disclosure are generally directed to network-centric cross-version integration. Being able to identify and specify application or micro-service version on the network allows per-flows cross-version integration and reduces the need to address specific versions on the application layer, and moves the integration between versions to a network-centric approach. For example, the network may control what versions are used together for specific data flows depending on defined policies, which may be important to assure that traffic is traversing a desired version. Confirmation regarding which versions traffic has traversed may be obtained through protocols such as in-band operation, administration, and maintenance (iOAM). In other words, an OAM data record may be generated which specifies the versions that the data traffic has traversed. The specifics of what versions are desired for which data flows may be either specified outside the network through version interoperability matrices, or specified directly on the network within metadata fields. This approach assures a network centric specification of software/micro-service version to guarantee a specific version of function is implemented.

Returning to FIG. 4, at block 404, the network entity may encapsulate a service header in the packet for the SFC, the service header indicating the plurality of network functions to be performed for the packet and the version information corresponding to the one or more network functions. For example, the service header may indicate the versions of the network functions as determined using machine learning. In certain aspects, at block 406, the network entity may send the packet to one or more service nodes for performing the plurality of network functions in accordance with the service header.

Figure 6:
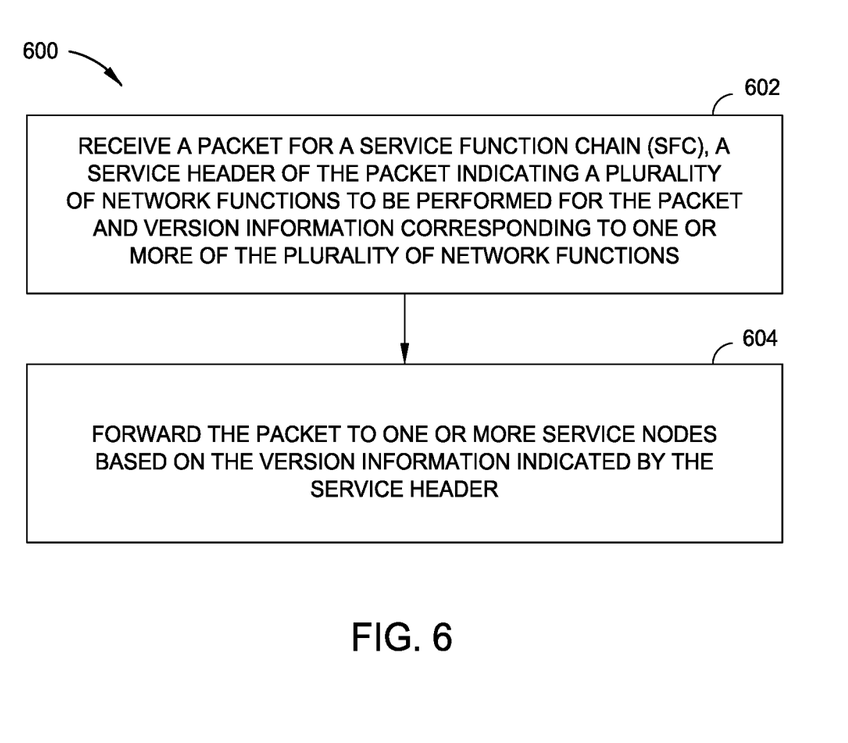
FIG. 6 is a flow diagram illustrating example operations for implementing a dynamic version-aware SFC, in accordance with certain aspects of the present disclosure.

FIG. 6 is a flow diagram illustrating example operations 600 for service function chaining, in accordance with certain aspects of the present disclosure. The operations 600 may be performed by a network entity, such as a service node or a service function forwarder (SFF).

The operations 600 begin, at block 602, by receiving a service header in a packet for a SFC, the service header indicating a plurality of network functions to be performed for the packet and version information corresponding to one or more of the plurality of network functions. In certain aspects, at block 604, the network entity forwards the packet to one or more service nodes based on the version information indicated by the service header.

Certain aspects of the present disclosure are directed to a dynamic and version-aware SFC. For instance, forwarding the packet to the one or more service nodes, at block 604, may be based on the version information indicated by the service header. In other words, the version information of a packet may be used to define version-aware network function chains. An SFC may be dynamically adjusted based on the version details incorporated within metadata fields of packets, thereby reducing the overhead in specifying version specific SFCs, and updating the SFCs whenever a version changes. For instance, version details in a packet may be identified to generate a SFC to forward the packet to the proper network function versions (e.g., proper service nodes that support the desired version of a service function). In some cases, the SFC may define the endpoints, while the service function, or the SFF, may use the version information to address the desired version of the service function next in the SFC.

Certain aspects of the present disclosure are generally directed to a version-aware policy enforcement technique. For example, the operations 400 may also include performing, at a service node, a first function of the plurality of functions for the packet in accordance with the version information corresponding to the first function indicated by the service header. The first function may be performed based on a policy, the policy being determined based on the version information corresponding to a subsequence function to be performed for the packet. Being able to specify the targeted software version on the network enables specific policy-enforcement that may otherwise not be possible. With the identification of different software versions (and any relevant metadata), network functions may be able to leverage the version information to define policies. This may apply to all policies that are currently applicable (and future ones) within the network. For example, within a SFC, one or more network functions may be performed differently based on the versions the traffic is destined to. This version-aware policy enforcement may be implemented for transit traffic, or for traffic destined to a specific version within the SFC.

In certain aspects, the policies for operating the network functions may be applied dynamically. For example, the policies may change on-demand depending on the version information, and the specifications of the versions corresponding to a particular SFC. The version-aware policy enforcement is important for defining dynamic SFCs that adjust automatically based on the version specified within the metadata fields of packets.

Figure 7:
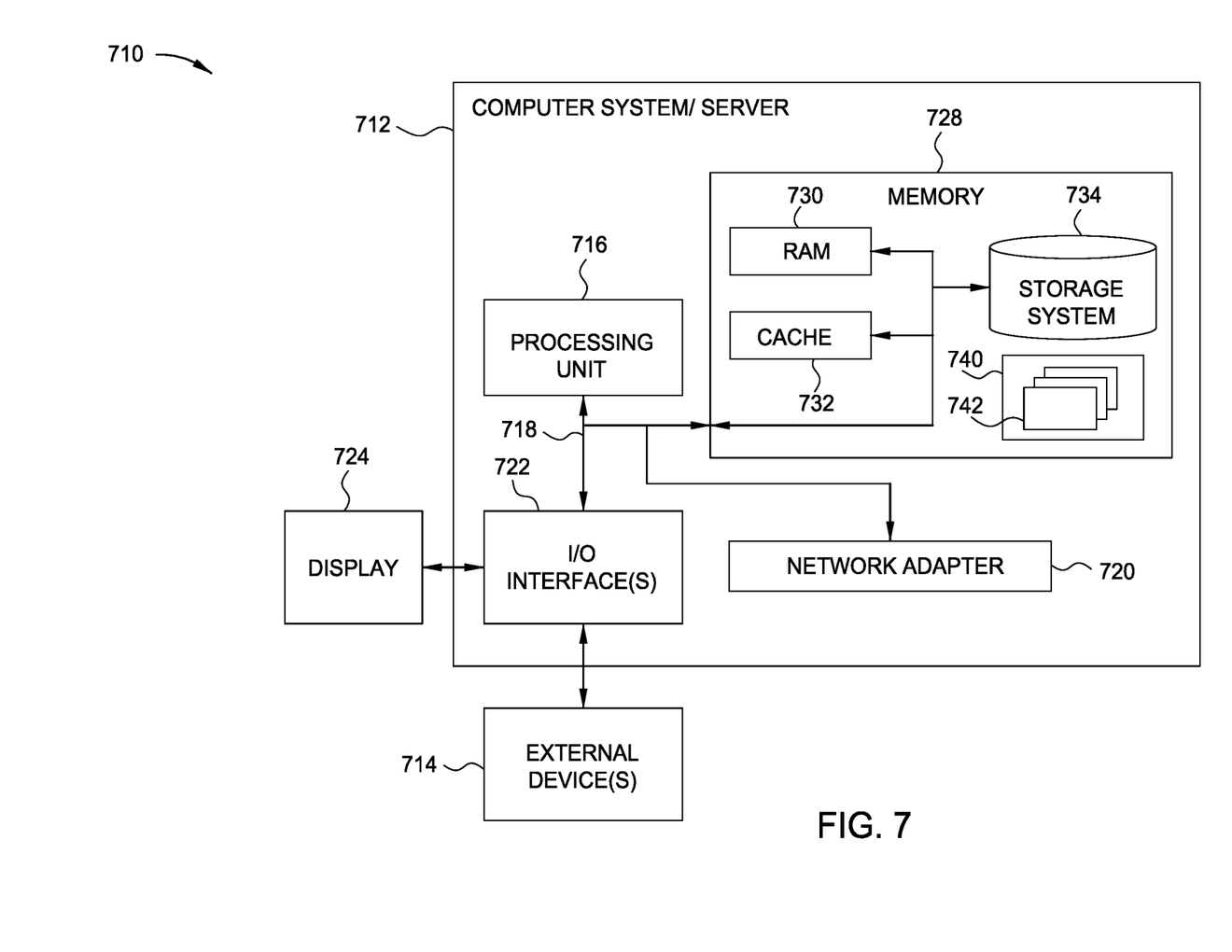
FIG. 7 is a schematic of an example computing device.

FIG. 7 is a schematic of an example computing device 710, such as a service node, a service function forwarder, or a service function classifier. The computing device 710 is only one example of a suitable computing device and is not intended to suggest any limitation as to the scope of use or functionality of aspects described herein. Regardless, the computing device 710 is capable of being implemented and/or performing any of the functionality set forth hereinabove. In computing device 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing device 710 is shown in the form of a general-purpose computing device. The components of computer system/server 712 may include, but are not limited to, one or more processors or processing units 716, a system memory 728, and a bus 718 that couples various system components including system memory 728 to processing unit 716.

Bus 718 represents one or more of any of several types of bus structures, including a memory bus or memory controller, a peripheral bus, an accelerated graphics port, and a processor or local bus using any of a variety of bus architectures.

Computer system/server 712 may include a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of aspects described herein.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of aspects described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via I/O interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

In the preceding, reference is made to aspects presented in this disclosure. However, the scope of the present disclosure is not limited to specific described aspects. Instead, any combination of the described features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the aspects disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    determining version information corresponding to one or more network functions to be performed for a packet relating to an ordered set of network functions, the version information identifying a version of the one or more network functions, among a plurality of available versions for the one or more network functions, each of the plurality of available versions for the one or more network functions relating to different software code for the one or more network functions;
    encapsulating a header in the packet for the ordered set of network functions, the header indicating the one or more network functions to be performed for the packet and the version information corresponding to the one or more network functions; and
    sending the packet to one or more nodes for performing the one or more network functions in accordance with the header for the ordered set of network functions and the version information, wherein the one or more nodes are configured to:
        identify a next destination for the packet, relating to performing the one or more network functions, based on determining that the network function version information indicated in the header for the ordered set of network functions corresponds to version information relating to the next destination; and
        forward the packet to the next destination.

2. The method of claim 1, wherein the header comprises a network service header (NSH) or a segment routing version 6 (SRv6) header.

3. The method of claim 1, wherein the determination of the version information corresponding to the one or more network functions is based on a dependency between versions of the one or more network functions.

4. The method of claim 3, further comprising:
    determining the dependency between the versions of the network functions based on previous interactions of the versions of the network functions using machine learning.

5. The method of claim 3, further comprising:
    determining the dependency between the versions of the network functions based on metadata corresponding to the packet.

6. The method of claim 5, wherein the metadata comprises a service level agreement of a client from which the packet is received.

7. The method of claim 1, wherein determining the version information comprises selecting a version of a network function of the one or more network functions for testing of code for the version of the network function.

8. The method of claim 1, wherein the version information corresponding to the one or more network functions is determined based on a policy corresponding to the packet.

9. The method of claim 8, wherein the policy comprises a low latency policy corresponding to the packet.

10. A non-transitory computer-readable medium having instructions, to be executed by a processor, for performing operations, the operations comprising:
    determining version information corresponding to one or more network functions to be performed for a packet relating to an ordered set of network functions, the version information identifying a version of the one or more network functions, among a plurality of available versions for the one or more network functions, each of the plurality of available versions for the one or more network functions relating to different software code for the one or more network functions;
    encapsulating a header in the packet for the ordered set of network functions, the header indicating the one or more network functions to be performed for the packet and the version information corresponding to the one or more network functions; and
    sending the packet to one or more nodes for performing the one or more network functions in accordance with the header for the ordered set of network functions and the version information, wherein the one or more nodes are configured to:
        identify a next destination for the packet, relating to performing the one or more network functions, based on determining that the network function version information indicated in the header for the ordered set of network functions corresponds to version information relating to the next destination; and
        forward the packet to the next destination.

11. The computer-readable medium of claim 10, wherein the determination of the version information corresponding to the one or more network functions is based on a dependency between versions of the one or more network functions.

12. The computer-readable medium of claim 11, the operations further comprising:
    determining the dependency between the versions of the network functions based on previous interactions of the versions of the network functions using machine learning.

13. The computer-readable medium of claim 11, the operations further comprising:

determining the dependency between the versions of the network functions based on metadata corresponding to the packet.

14. The computer-readable medium of claim 13, wherein the metadata comprises a service level agreement of a client from which the packet is received.

15. The computer-readable medium of claim 10, wherein determining the version information comprises selecting a version of a network function of the plurality of network functions for testing of code for the version of the network function.

16. The computer-readable medium of claim 10, wherein the version information corresponding to the one or more network functions is determined based on a policy corresponding to the packet.

17. A method, comprising:
receiving a packet for an ordered set of network functions, a header of the packet indicating one or more network functions to be performed for the packet and version information corresponding to the one or more network functions, the version information identifying a version of the one or more network functions, among a plurality of available versions for the one or more network functions, each of the plurality of available versions for the one or more network functions relating to different software code for the one or more network functions;
identifying a next destination for the packet, relating to performing the one or more network functions, based on determining that the network function version information indicated in the header for the ordered set of network functions corresponds to version information relating to the next destination; and
forwarding the packet to identified next destination.

18. The method of claim 17, further comprising:
performing, at a node, a first function of the one or more network functions for the packet in accordance with the version information corresponding to the first function indicated by the header.

19. The method of claim 18, wherein the first function is performed based on a policy, the policy being determined based on the version information corresponding to a subsequence function to be performed for the packet.

20. The method of claim 18, wherein forwarding the packet to the one or more service nodes comprises forwarding the packet to a service function forwarder (SFF).

* * * * *